US011388059B2

(12) United States Patent
Matsumoto et al.

(10) Patent No.: US 11,388,059 B2
(45) Date of Patent: Jul. 12, 2022

(54) CONNECTION DEVICE AND CONNECTION METHOD USING PRIORITY LEVEL INFORMATION FOR A PLURALITY OF PROCESSES

(71) Applicant: Clarion Co., Ltd., Saitama (JP)

(72) Inventors: Takashi Matsumoto, Tokyo (JP); Yasushi Nagai, Yokohama (JP); Susumu Kojima, Matsudo (JP); Ryo Shimizu, Yokohama (JP); Motohiro Fuji, Higashikurume (JP); Kiminori Nakamura, Yokohama (JP)

(73) Assignee: Clarion Co., Ltd., Saitama (JP)

( * ) Notice: Subject to any disclaimer, the term of this patent is extended or adjusted under 35 U.S.C. 154(b) by 134 days.

(21) Appl. No.: 16/680,703

(22) Filed: Nov. 12, 2019

(65) Prior Publication Data

US 2020/0084111 A1    Mar. 12, 2020

Related U.S. Application Data

(63) Continuation of application No. 14/602,024, filed on Jan. 21, 2015, now Pat. No. 10,516,576.

(30) Foreign Application Priority Data

Jan. 22, 2014    (JP) .................................. 2014-009418

(51) Int. Cl.
*H04L 41/12*    (2022.01)
*H04L 41/02*    (2022.01)
*H04L 69/18*    (2022.01)

(52) U.S. Cl.
CPC .............. *H04L 41/12* (2013.01); *H04L 41/02* (2013.01); *H04L 69/18* (2013.01)

(58) Field of Classification Search
CPC .......... H04L 41/12; H04L 41/02; H04L 69/18
See application file for complete search history.

(56) References Cited

U.S. PATENT DOCUMENTS

2008/0311912 A1* 12/2008 Balasubramanian ........................ H04W 48/18 455/436
2012/0124229 A1* 5/2012 Sahu ..................... H04W 76/10 709/228

(Continued)

FOREIGN PATENT DOCUMENTS

EP    2 053 829 A1    4/2009
JP    2010-199718 A    9/2010

OTHER PUBLICATIONS

European Search Report issued in counterpart European Application No. 15000143.6 dated Jul. 23, 2015 (Nine (9) pages).

(Continued)

*Primary Examiner* — Chris Parry
*Assistant Examiner* — Steven C Nguyen
(74) *Attorney, Agent, or Firm* — Crowell & Moring LLP

(57) ABSTRACT

Provided is a technology for enabling smooth execution of a plurality of pieces of application software which perform communication via a communication path. A connection device includes: a storage unit which stores type priority level information for specifying a priority level assigned in advance for each type of a process, usable communication system information for specifying a usable communication system for each process, and sharing propriety information for specifying whether or not the communication system is sharable among a plurality of processes during the same period of time; a plurality of communication units which communicate to and from another device with use of the communication systems different from one another; and a communication system allocation control unit configured to (Continued)

COMMUNICATION SHARING PROPRIETY STORAGE AREA 123

| COMMUNICATION SYSTEM (123A) | SHARABLE/NON-SHAREABLE (123B) |
|---|---|
| BT-SPP1 | NON-SHARABLE |
| BT-SPP2 | NON-SHARABLE |
| BT-SPP3 | NON-SHARABLE |
| BT-A2DP | NON-SHARABLE |
| BT-HFP | NON-SHARABLE |
| USB1 | SHARABLE |
| USB2 | SHARABLE |
| WIRELESS LAN-AP | SHARABLE |
| WIRELESS LAN-Direct | NON-SHARABLE |
| MOBILE COMMUNICATION | SHARABLE |
| HDMI | NON-SHARABLE |
| ... | ... | identify the usable communication system and allocate, when the identified communication system is not sharable, the process to use the communication system based on the priority levels.

9 Claims, 17 Drawing Sheets

(56) References Cited

U.S. PATENT DOCUMENTS

| | | |
|---|---|---|
| 2014/0032787 A1 | 1/2014 | Avasthi |
| 2014/0163774 A1 | 6/2014 | Demeniuk |
| 2016/0014547 A1* | 1/2016 | Yae ......................... H04W 4/80 |
| | | 455/418 |
| 2016/0014632 A1 | 1/2016 | Siow |
| 2016/0105924 A1 | 4/2016 | Baek |
| 2017/0289810 A1* | 10/2017 | O'Meara ............... H04W 76/10 |

OTHER PUBLICATIONS

"Removable User Identity Module for Spread Spectrum Systems", $3^{rd}$ Generation Partnership Project 2 "3GPP2", 2013, pp. 3-84-3-85, (Three (3) pages).

* cited by examiner

FIG. 2

APPLICATION COMMUNICATION SYSTEM STORAGE AREA 121

| APPLICATION IDENTIFIER | APPLICATION NAME | APPLICATION TYPE | COMMUNICATION SYSTEM |
|---|---|---|---|
| 0001 | CONTROL UNIT | CONTROL UNIT | BT-SPP |
| 0002 | APPLICATION A | MUSIC | BT-SPP |
| 0003 | APPLICATION B | MUSIC | BT-SPP |
| 0004 | APPLICATION C | MUSIC | USB |
| 0005 | APPLICATION D | MUSIC | WIRELESS LAN-AP |
| 0006 | APPLICATION E | NAVIGATION | BT-SPP |
| 0007 | APPLICATION F | SPEECH RECOGNITION | BT-SPP |
| 0008 | APPLICATION G | GENERAL | BT-SPP |
| ... | ... | ... | ... |

APPLICATION TYPE PRIORITY LEVEL STORAGE AREA 122

FIG. 4

COMMUNICATION SHARING PROPRIETY STORAGE AREA 123

| COMMUNICATION SYSTEM (123A) | SHARABLE/NON-SHAREABLE (123B) |
|---|---|
| BT-SPP1 | NON-SHARABLE |
| BT-SPP2 | NON-SHARABLE |
| BT-SPP3 | NON-SHARABLE |
| BT-A2DP | NON-SHARABLE |
| BT-HFP | NON-SHARABLE |
| USB1 | SHARABLE |
| USB2 | SHARABLE |
| WIRELESS LAN-AP | SHARABLE |
| WIRELESS LAN-Direct | NON-SHARABLE |
| MOBILE COMMUNICATION | SHARABLE |
| HDMI | NON-SHARABLE |
| ... | ... |

FIG. 5

COMMUNICATION STATE STORAGE AREA  124

| COMMUNICATION SYSTEM (124A) | USABLE/ UNUSABLE (124B) | APPLICATION IDENTIFIER (124C) | APPLICATION TYPE (124D) |
|---|---|---|---|
| BT-SPP1 | USABLE | 0001 | CONTROL UNIT |
| BT-SPP2 | USABLE | 0002 | MUSIC |
| BT-SPP3 | UNUSABLE | | |
| BT-A2DP | USABLE | | |
| BT-HFP | USABLE | XXXX | CALLING |
| USB1 | USABLE | XXXX | GENERAL |
| USB2 | USABLE | | |
| WIRELESS LAN-AP | USABLE | | |
| WIRELESS LAN-Direct | USABLE | | |
| MOBILE COMMUNICATION | USABLE | | |
| HDMI | USABLE | | |
| ... | ... | ... | ... |

FIG. 10

APPLICATION COMMUNICATION SYSTEM STORAGE AREA 121'

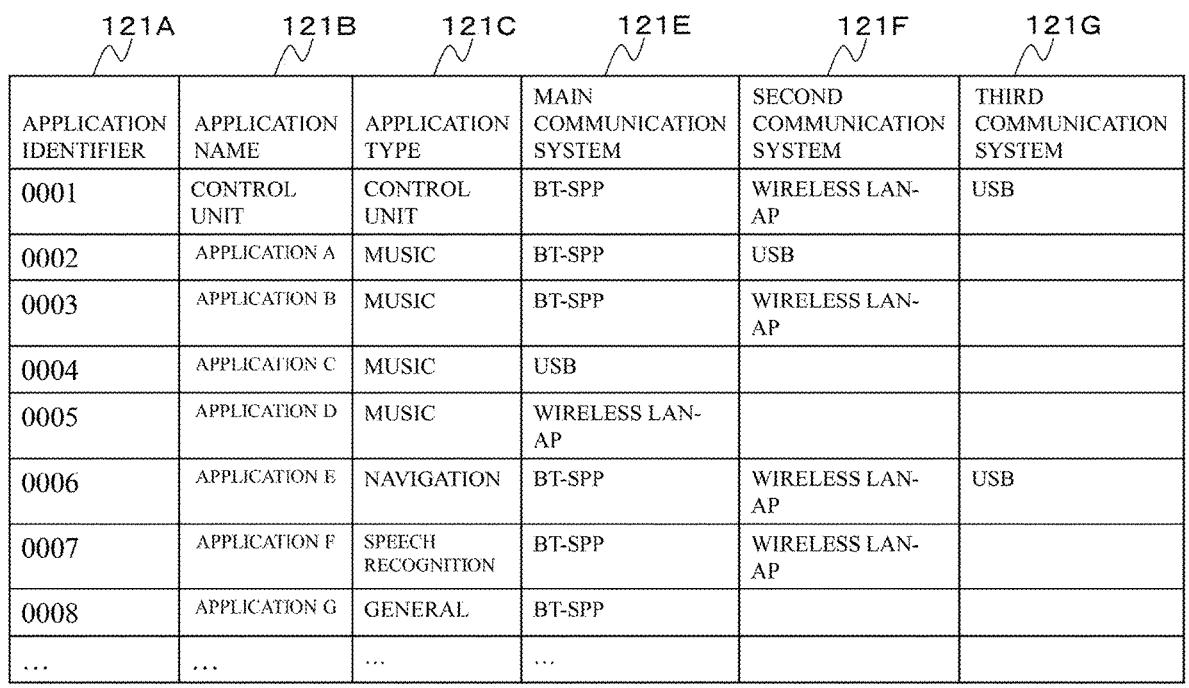

| APPLICATION IDENTIFIER 121A | APPLICATION NAME 121B | APPLICATION TYPE 121C | MAIN COMMUNICATION SYSTEM 121E | SECOND COMMUNICATION SYSTEM 121F | THIRD COMMUNICATION SYSTEM 121G |
|---|---|---|---|---|---|
| 0001 | CONTROL UNIT | CONTROL UNIT | BT-SPP | WIRELESS LAN-AP | USB |
| 0002 | APPLICATION A | MUSIC | BT-SPP | USB | |
| 0003 | APPLICATION B | MUSIC | BT-SPP | WIRELESS LAN-AP | |
| 0004 | APPLICATION C | MUSIC | USB | | |
| 0005 | APPLICATION D | MUSIC | WIRELESS LAN-AP | | |
| 0006 | APPLICATION E | NAVIGATION | BT-SPP | WIRELESS LAN-AP | USB |
| 0007 | APPLICATION F | SPEECH RECOGNITION | BT-SPP | WIRELESS LAN-AP | |
| 0008 | APPLICATION G | GENERAL | BT-SPP | | |
| ... | ... | ... | ... | | |

CONNECTION DEVICE AND CONNECTION METHOD USING PRIORITY LEVEL INFORMATION FOR A PLURALITY OF PROCESSES

CROSS REFERENCE

This application is a continuation of U.S. application Ser. No. 14/602,024, filed Jan. 21, 2015, which claims priority from Japanese Patent Application No. 2014-009418, filed Jan. 22, 2014, the disclosures of which are expressly incorporated by reference herein.

BACKGROUND OF THE INVENTION

The present invention relates to a technology of a connection device. Hitherto, there has been disclosed a technology relating to an in-vehicle device including: a profile management unit which cooperates with a portable terminal device taken in a vehicle interior of a vehicle through wireless communication and manages information on a profile required for execution of an application owned by the portable terminal device; a profile acquisition unit which acquires information on an owned profile owned by the portable terminal device through wireless communication; an application information acquisition unit which acquires information on an owned application owned by the portable terminal device through wireless communication; and a cooperation feasibility determination unit which determines, based on the information on the owned profile, which is acquired by the profile acquisition unit, the information on the owned application, which is acquired by the application information acquisition unit, and the information on the profile, which is managed by the profile management unit, whether or not an execution result of the application executed on the portable terminal device can be acquired in cooperation with the portable terminal device through wireless communication.

CITATION LIST

Patent Literature

[PTL 1] JP 2010-199718 A

With such a technology as described above, a communication system to be used for the cooperation between the in-vehicle device and the portable terminal device at the time of execution of the application software can be selected when the application software is activated. In a case where software that is already in execution and uses a communication system common to the application software to be activated is exclusively using the communication system in question, however, the application software to be activated cannot start communication, and hence in some cases, the application software to be activated cannot be actually activated unless the execution of the application software in execution is finished.

SUMMARY OF THE INVENTION

It is an object of the present invention to provide a technology for enabling smooth execution of a plurality of pieces of application software which perform communication via a communication path.

Solution to Problems

The present invention includes a plurality of measures for solving at least a part of the above-mentioned problem, examples of which include the following. In order to solve the above-mentioned problem, a connection device according to one embodiment of the present invention includes: a storage unit which stores type priority level information for specifying a priority level assigned in advance for each type of a process, usable communication system information for specifying a usable communication system for each process, and sharing propriety information for specifying whether or not the communication system is sharable among a plurality of processes during the same period of time; a plurality of communication units which communicate to and from another device with use of the communication systems different from one another; and a communication system allocation control unit configured to: use the usable communication system information to identify the communication system usable by the process to be started to be executed; and allocate, when the identified communication system is not sharable and a process in execution that is different from the process to be started to be executed already uses the identified communication system, the process to use the communication system based on the priority levels of the process in execution and the process to be started to be executed.

Objects, configurations, and effects other than those described above become apparent from the following descriptions of embodiments of the present invention.

According to one embodiment of the present invention, it is possible to provide the technology for enabling smooth execution of the plurality of pieces of application software which perform communication via the communication path.

BRIEF DESCRIPTION OF THE DRAWINGS

FIG. 2 shows a data structure of an application communication system storage area.

FIG. 4 shows a data structure of a communication sharing propriety storage area.

FIG. 5 shows a data structure of a communication state storage area.

FIG. 10 shows a data structure of an application communication system storage area according to a second embodiment of the present invention.

DESCRIPTION OF THE PREFERRED EMBODIMENTS

Now, a description is given of a connection device 100 according to one embodiment of the present invention with reference to the accompanying drawings.

Figure 1:
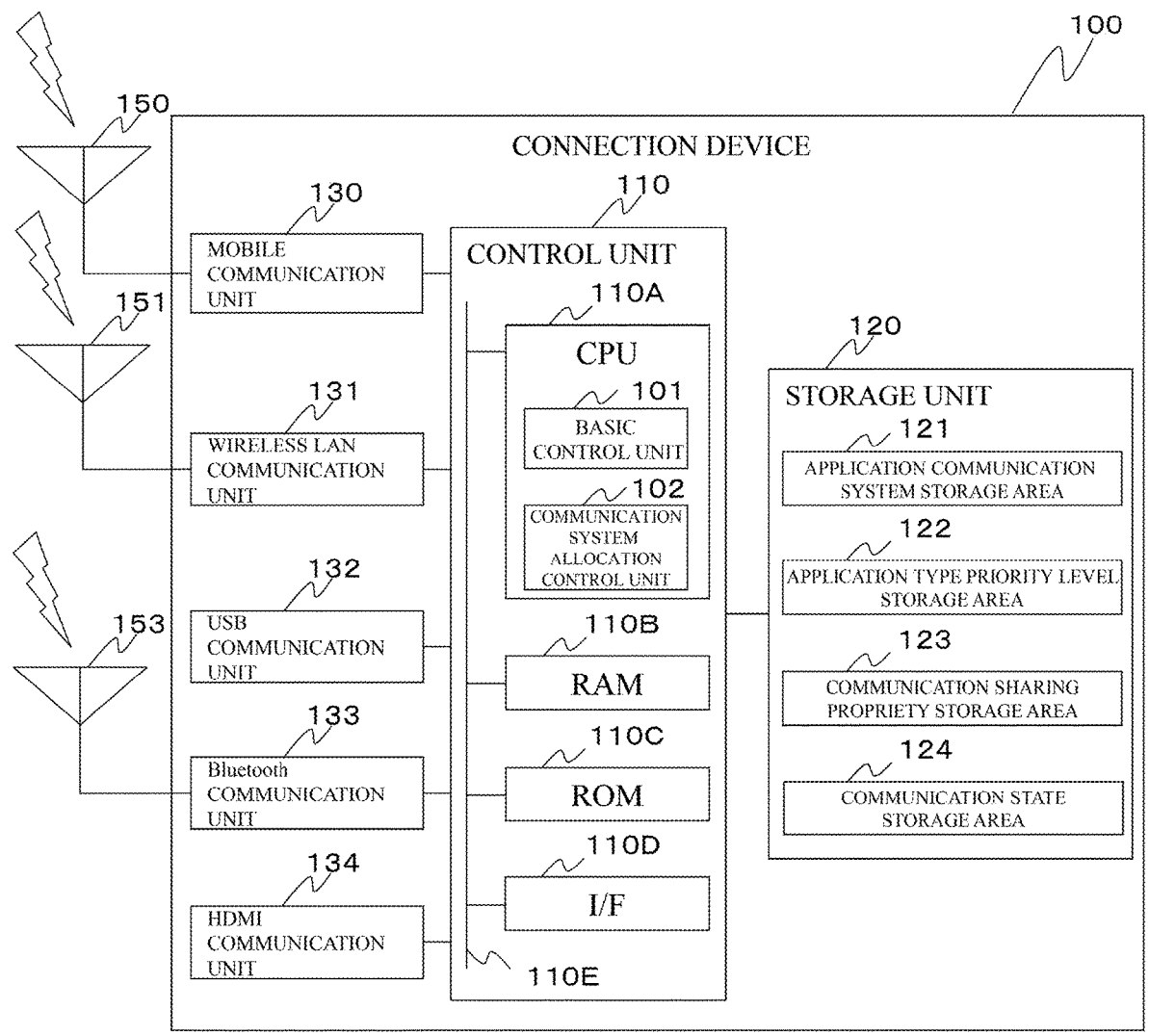
FIG. 1 is a schematic configuration diagram of a connection device according to a first embodiment of the present invention.

FIG. 1 illustrates an overview of the connection device 100 according to one embodiment of the present invention. The connection device 100 is capable of communicating to/from another device (not shown) described later by a wireless or wired communication system or a combination of those. Note that, another device is connected to the connection device 100 with the use of various communication systems, such as the Internet through mobile communication, a wide area network through a wireless local area network (LAN), wired communication such as a USB (trademark) cable, short-range wireless communication such as Bluetooth (trademark), and wired communication such as a High-Definition Multimedia Interface (HDMI: trademark) cable.

Typically, the connection device 100 is connected to a mobile body such as a vehicle. The connection device 100 is, however, not limited to the one installed in the mobile body such as a vehicle. The connection device 100 may also be installed in a building, or may have such a size and shape as to enable a user to carry the connection device 100.

Further, another device that can be connected to the connection device 100 through communication is a terminal such as a mobile phone in this embodiment, and examples of the terminals include a smartphone and a feature phone. The present invention is, however, not limited thereto. Another device may also be, for example, a personal digital assistance (PDA), a note PC, a tablet PC, a wearable PC, a household electronic appliance such as a refrigerator or a television, or other information processing devices.

In this embodiment, the connection device 100 and another device establish connection for communication when a state in which wireless communication can be performed between those devices is reached in accordance with an instruction given by an operator or the operator connects a physical cable such as a USB cable or an HDMI cable.

Another device is capable of, for example, performing hands-free communication to/from the connection device 100 and transmitting a music file and the like. It should be understood that the present invention is not limited thereto, and another device is also capable of giving an instruction to reproduce streaming data and transmitting the streaming data, or transmitting location information and route information that are included in a travel plan or the like.

The connection device 100 includes a control unit 110, a storage unit 120, a mobile communication unit 130, a wireless LAN communication unit 131, a USB communication unit 132, a Bluetooth communication unit 133, and an HDMI communication unit 134.

The control unit 110 is a central unit which performs various types of processing. The control unit 110 may be configured to, for example, calculate a current location based on information output from various sensors, a GPS receiver, an FM multiplex broadcast receiver, and the like. The control unit 110 may also be configured to read map data necessary for display from the storage unit or the like based on the acquired current location to generate display information.

The control unit 110 may further be configured to, for example, deploy the read map data into graphics, and use the map data and the like to search for a recommended route, which is an optimal route that connects the current location or a departure location designated by the user to a destination (which may be a via point or a stop-off point). Note that, the processing of the control unit 110 is not limited to the one described above, and may also be configured to execute other types of processing.

The control unit 110 of the connection device 100 has a configuration in which its respective devices are connected to one another by a bus 110E. The control unit 110 includes a central processing unit (CPU) 110A which executes various types of processing such as numerical computation and controlling of the respective devices, a random access memory (RAM) 110B which stores the map data, the music data, and the like read from the storage unit 120 including a storage device, a ROM 110C which stores programs and data, and an interface (I/F) 110D which connects various pieces of hardware to the control unit 110.

Note that, the connection device 100 may also include a display or the like, which is a unit which displays graphics information generated by the control unit 110 or the like. The display is constructed of, for example, a liquid crystal display or an organic electroluminescence (EL) display.

The storage unit 120 is implemented by the storage device constructed of a storage medium that is at least readable and writable such as a hard disk drive (HDD), a solid state drive (SSD), or a non-volatile memory card.

The storage unit 120 includes an application communication system storage area 121, an application type priority level storage area 122, a communication sharing propriety storage area 123, and a communication state storage area 124.

FIG. 2 shows a structure example of the application communication system storage area 121. The application communication system storage area 121 stores, for each piece of application software, which is a process executed in the connection device 100, a communication system usable by the application software in association with the application software so that the usable communication system can be identified. In other words, the application communication system storage area 121 stores usable communication system information for specifying a usable communication system for each process. Note that, in the description of this embodiment, an executable unit of the application software is a process in order to simplify the description, but the present invention is not limited thereto. For example, in a case where the application software is implemented by a plurality of processes, the plurality of processes may be collectively identified as an application. Further, in a case where executable units of a plurality of pieces of application software are mixed in one process, an application may also be identified with the use of an executable unit of each piece of application software.

The application communication system storage area 121 includes an application identifier 121A, an application name 121B, an application type 121C, and a communication system 121D.

The application identifier 121A is information uniquely specifying the application software on the connection device 100. The application name 121B is a formal name, commonly-known name, abbreviated name, or other such names of the application software specified by the application identifier 121A.

The application type 121C is information specifying a type of the application software specified by the application identifier 121A. For example, the application type 121C stores any one of the types including a control type for communication between the connection device 100 and another device, a navigation type, an audio type, a speech recognition type, and other types. The types to be stored are not limited to those types, and the application type 121C may alternatively store, for example, information specifying such a type as to enable distinction between a real-time communication type process requiring continuous communication and an intermittent communication type process only requiring communication performed at a predetermined timing.

The communication system 121D is information specifying the communication system used by the application software specified by the application identifier 121A. Examples of the communication system 121D include profiles used in Bluetooth communication such as Serial Port Profile (SPP), Advanced Audio Distribution Profile (A2DP), and Hands-Free Profile (HFP). Further, for example, the communication system 121D includes information specifying distinction between infrastructure communication and ad hoc communication in a wireless LAN communication such as IEEE 802.11a/b/g/n, or various types of communication systems such as USB, mobile communication such as a mobile phone network, and HDMI.

Figure 3:
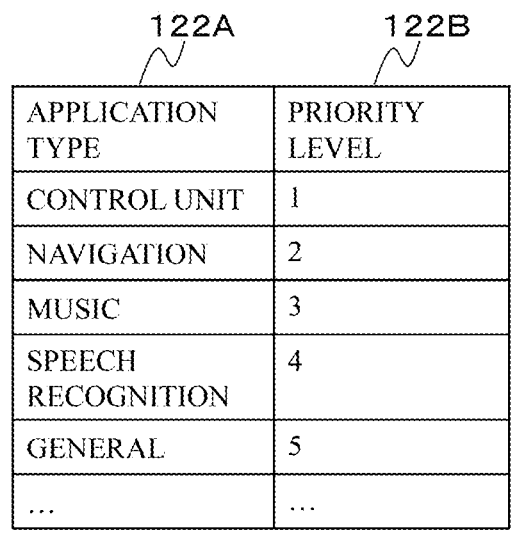
FIG. 3 shows a data structure of an application type priority level storage area.

FIG. 3 shows a structure example of the application type priority level storage area 122. The application type priority level storage area 122 stores, for each type classifying application software, which is a process executed in the connection device 100, information specifying a priority level in a case where the use of the communication system conflicts in association with the type. In other words, the application type priority level storage area 122 stores type priority level information specifying a priority level assigned in advance for each type of a process. The application type priority level storage area 122 includes an application type 122A and a priority level 122B.

The application type 122A is information specifying the type of the application software as in the application type 121C. The priority level 122B is information for determining, for each application type 122A, when the same communication system needs to be used exclusively (for example, the communication system is the one that does not allow sharing), a specific process that can use communication preferentially among this specific process and the processes of other pieces of application software. The priority level 122B is, for example, information indicating that as its value of the priority level becomes smaller, its associated type of the application software can be used more preferentially.

FIG. 4 shows a structure example of the communication sharing propriety storage area 123. The communication sharing propriety storage area 123 stores, for each communication system usable in the connection device 100, information specifying whether or not the communication system allows the use by a plurality of processes during the same period of time in regards to the same communication system (can be shared by the plurality of processes) in association with the communication system. In other words, the communication sharing propriety storage area 123 stores communication sharing propriety information specifying whether or not the communication system is sharable among the plurality of processes during the same period of time. The communication sharing propriety storage area 123 includes a communication system 123A and sharable/non-shareable 123B.

The communication system 123A includes, for example, as in the communication system 121D, the profiles used in Bluetooth communication such as SPP, A2DP, and HFP. Further, for example, the communication system 123A includes information specifying distinction between the infrastructure communication and the ad hoc communication in the wireless LAN communication such as IEEE 802.11a/b/g/n, or various types of communication systems such as USB, mobile communication such as a mobile phone network, and HDMI.

The sharable/non-shareable 123B is information specifying, for each communication system specified by the communication system 123A, whether or not the communication system is sharable by the plurality of processes.

FIG. 5 shows a structure example of the communication state storage area 124. The communication state storage area 124 stores, for each communication system usable in the connection device 100, information specifying whether or not communication to/from another connectable device is usable and information specifying a specific process that actually performs communication to/from another device in association with the communication system. The communication state storage area 124 stores a communication system 124A, usable/unusable 124B, an application identifier 124C, and an application type 124D.

The communication system 124A includes, for example, as in the communication system 121D, the profiles used in Bluetooth communication such as SPP, A2DP, and HFP. Further, for example, the communication system 124A includes information specifying distinction between the infrastructure communication and the ad hoc communication in the wireless LAN communication such as IEEE 802.11a/b/g/n, or various types of communication systems such as USB, mobile communication such as a mobile phone network, and HDMI.

The usable/unusable 124B is information specifying, for each communication system specified by the communication system 124A, whether or not the communication system is usable in common to another connectable device. For example, in a case where the connection device 100 is capable of communication using BT-SPP3, that is, the third connection of communication using the SPP profile of Bluetooth, when another device is compatible with only the first and second connections, information of "Unusable" indicating the corresponding communication system is unusable is stored in the usable/unusable 124B of BT-SPP3.

The application identifier 124C is information specifying the application software implemented by the process using the communication system 124A. The application type 124D is information specifying the type of the application software specified by the application identifier 124C.

A description is given referring back to FIG. 1. The connection device 100 may also include a microphone as an audio input device, a speaker as an audio output device, a controller and a touch panel as various input devices, a display and a printer as output device, a satellite wave receiver, a gyro sensor, an acceleration sensor, and a vehicle speed sensor as various sensor devices, a storage medium reading device which reads information stored in a portable storage medium or the like as an external information acquisition device, and others, which are not shown.

The mobile communication unit 130 communicates to/from a base station of the mobile phone network with the use of an antenna 150 capable of transmitting and receiving a radio wave having a predetermined frequency. The mobile communication unit 130 is compatible with communication performed in a predetermined frequency band.

The wireless LAN communication unit 131 performs wireless LAN communication such as IEEE 802.11a/b/g/n with the use of an antenna 151 capable of transmitting and receiving a radio wave having a predetermined frequency, and enables communication to/from other devices.

The USB communication unit 132 uses a USB standard such as USB 1.0, USB 2.0, or USB 3.0 to enable communication to/from other devices connected by a USB cable.

The Bluetooth communication unit 133 uses various profiles of Bluetooth to enable communication to/from other devices through wireless communication with the use of an antenna 153 capable of transmitting and receiving a radio wave having a predetermined frequency.

The HDMI communication unit 134 uses the HDMI standard to enable communication to/from other devices connected by an HDMI cable or the like.

In other words, the mobile communication unit 130, the wireless LAN communication unit 131, the USB communication unit 132, the Bluetooth communication unit 133, and the HDMI communication unit 134 are a plurality of communication units which communicate to/from another device with use of communication systems different from one another.

The control unit 110 includes a basic control unit 101 which performs basic control such as activation management for the connection device 100 itself and a communication system allocation control unit 102 which performs control of allocating the communication system for each process to be executed.

The communication system allocation control unit 102 searches the application communication system storage area 121 to identify the communication system usable by the process to be started to be executed, and searches the communication sharing propriety storage area 123 to identify whether or not the usable communication system is sharable. When the usable communication system is not sharable and the process in execution that is different from the process already uses the communication system, the communication system allocation control unit 102 searches the application type priority level storage area 122 to identify the priority levels of the process in execution and the process to be started to be executed, and determines the process to use the communication system based on the values of the priority levels to allocate the determined process.

The communication system allocation control unit 102 is, in other words, a communication system allocation control unit configured to: use the usable communication system information to identify the communication system usable by the process to be started to be executed; and allocate, when the usable communication system is not sharable and the process in execution that is different from the process already uses the communication system, the process to use the communication system based on the priority levels of the process in execution and the process to be started to be executed.

The above-mentioned function units of the control unit 110, that is, the basic control unit 101 and the communication system allocation control unit 102 are each built by the CPU 110A reading and executing a predetermined program. The program for implementing the processing of the respective function units is therefore stored in the RAM 110B.

Note that, the above-mentioned respective components are the ones obtained by classifying the configuration of the connection device 100 based on their main processing details in order to facilitate understanding. The invention of this application is therefore not limited by a method for classification of the components and their names. The configuration of the connection device 100 may be further classified into a larger number of components based on their processing details. The configuration of the connection device 100 may be further classified into other components so that each component performs larger pieces of processing.

Further, the respective function units may be constructed of hardware (such as an ASIC and a GPU). Further, the processing of the respective function units may be executed by one piece of hardware, or may be executed by a plurality of pieces of hardware.

[Description of Operation]

Figure 6:
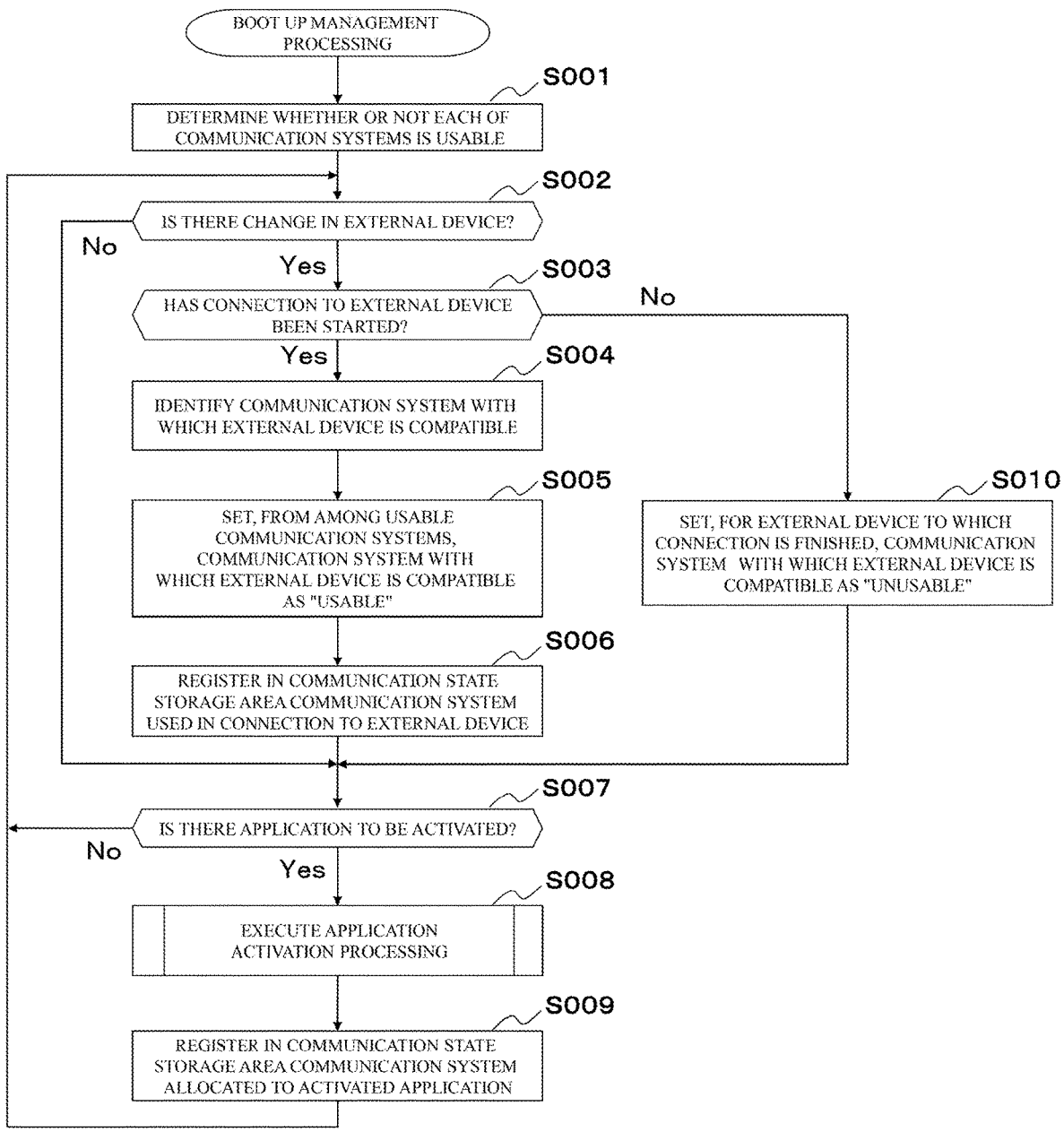
FIG. 6 is a diagram illustrating a flow of boot up management processing.

Next, a description is given of an operation of boot up management processing executed by the connection device 100. The boot up management processing illustrated in FIG. 6 is started when the connection device 100 starts booting up.

The communication system allocation control unit 102 first determines whether or not each of the communication systems is usable (Step S001). Specifically, the communication system allocation control unit 102 inquires of the basic control unit 101 as to the communication system usable by the connection device 100 to identify the usable communication system. In response to this inquiry, the basic control unit 101 inquires of each of the mobile communication unit 130, the wireless LAN communication unit 131, the USB communication unit 132, the Bluetooth communication unit 133, and the HDMI communication unit 134 whether or not communication can be established with the use of the corresponding communication unit to determine whether or not the communication system is usable based on a result of the inquiry.

The communication system allocation control unit 102 then determines whether or not there is a change in an external device (Step S002). Specifically, the communication system allocation control unit 102 detects another device (external device), and when the external device is the same as the one connected at the time of a previous check, the communication system allocation control unit 102 determines that there is no change, and determines that there is a change when the external device is different from the one connected at the time of the previous check.

When there is no change in the external device ("No" in Step S002), the communication system allocation control unit 102 advances the control to Step S007, which is described later.

When there is a change in the external device ("Yes" in Step S002), the communication system allocation control unit 102 determines whether or not connection to the external device has been started (Step S003). Specifically, the communication system allocation control unit 102 determines whether or not communication to/from the changed external device has been established. When the connection to the external device has not been started ("No" in Step S003), the communication system allocation control unit 102 advances the control to Step S010, which is described later.

The communication system allocation control unit 102 identifies the communication system with which the external device is compatible (Step S004). Specifically, the communication system allocation control unit 102 tries connection to another device with the use of one or a plurality of communication systems, and uses the usable communication system to instruct another device to notify of the communication system usable by another device. The communication system allocation control unit 102 then acquires the usable communication system from another device. Alternatively, the communication system allocation control unit 102 may acquire, from a predetermined external server or the like, a list of communication systems with which the external device is compatible in a communicable manner based on model information on another device or the like.

The communication system allocation control unit 102 then sets, from among the communication systems usable by the connection device 100, the communication system with which the external device is compatible as "Usable" (Step S005). Specifically, the communication system allocation control unit 102 performs matching between the communication systems usable by the connection device 100 identified in Step S001 and the usable communication systems acquired in Step S004 from another device, and sets the usable/unusable 124B of the communication system usable in common of the communication state storage area 124 to "Usable", and sets the usable/unusable 124B of other communication systems to "Unusable".

The communication system allocation control unit 102 then registers the communication system used in the connection to the external device in the communication state storage area 124 (Step S006). Specifically, the communication system allocation control unit 102 stores, in the application identifier 124C of the communication system used in the communication to/from another device in Step S004 of the communication state storage area 124, the application identifier of the communication system allocation control unit 102 itself. The communication system allocation control unit 102 further searches the application type 121C of the application communication system storage area 121 to identify the application type of the communication system allocation control unit 102, and stores the identified application type in the application type 124D of the process using the communication system.

The communication system allocation control unit 102 then determines whether or not there is an application to be activated (Step S007). Specifically, the communication system allocation control unit 102 inquires of the basic control unit 101, and when detecting that there is a process for which a start instruction has been issued, the communication system allocation control unit 102 starts Step S008, and otherwise, returns the control to Step S002.

The communication system allocation control unit 102 then executes application activation processing (Step S008). Specifically, the communication system allocation control unit 102 starts the application activation processing described later.

The communication system allocation control unit 102 then registers in the communication state storage area 124 the communication system allocated to the activated application (Step S009). Specifically, when the communication system allocation control unit 102 activates the process in Step S008, the communication system allocation control unit 102 identifies, for the communication system allocated to the activated process, the application identifier and the application type of the application software implemented by the process to be used, and stores the identified application identifier and application type in the application identifier 124C and the application type 124D, respectively. The communication system allocation control unit 102 then returns the control to Step S002.

Note that, when "No" is determined in Step S003, the communication system allocation control unit 102 sets, for the external device to which the connection is finished, the communication system with which the external device is compatible as "Unusable" (Step S010). Specifically, the communication system allocation control unit 102 stores, for the communication system set as "Usable" for another device to which connection is finished, information of "Unusable" in the usable/unusable 124B of the communication state storage area 124 to prepare for connection to another device. The communication system allocation control unit 102 then advances the control to Step S007.

The processing flow of the boot up management processing is described above. According to the boot up management processing, it is possible to identify the communication system in a usable state that is appropriate for another connected device.

Figure 7:
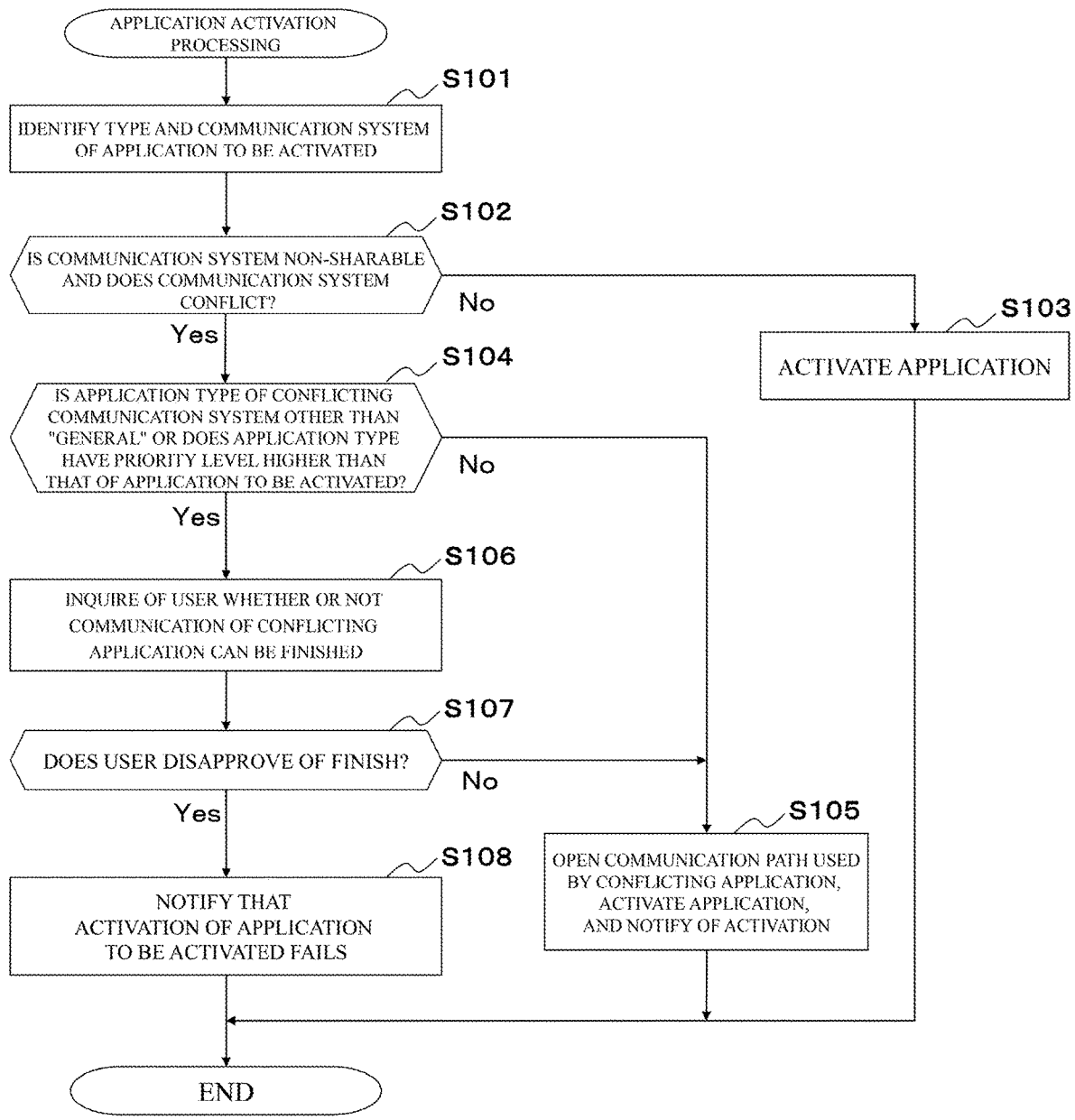
FIG. 7 is a diagram illustrating a flow of application activation processing.

FIG. 7 is a diagram illustrating a processing flow of the application activation processing. The application activation processing is started in Step S008 of the boot up management processing.

The communication system allocation control unit 102 first identifies the type and the communication system of the application to be activated (Step S101). Specifically, the communication system allocation control unit 102 identifies the application software implemented by the process to be activated, and reads the application type 121C and the communication system 121D of the application communication system storage area 121 to identify the application type and the communication system to be used of the application software.

The communication system allocation control unit 102 then determines whether or not the communication system is non-sharable and conflicts (Step S102). Specifically, the communication system allocation control unit 102 refers to the communication sharing propriety storage area 123 to identify whether or not the communication system identified in Step S101 is sharable. The communication system allocation control unit 102 further determines that the communication system conflicts when the application identifier of another process is stored in the application identifier 124C of the communication system identified in Step S101 of the communication state storage area 124.

When the communication system is sharable or does not conflict ("No" in Step S102), the communication system allocation control unit 102 activates the application to be activated (Step S103). The communication system allocation control unit 102 then ends the application activation processing.

When the communication system is non-sharable and conflicts ("Yes" in Step S102), the communication system allocation control unit 102 determines whether or not the application type of the conflicting communication system is other than "General" or has a priority level higher than that of the application to be activated (Step S104). Specifically, the application type 124D of the communication system allocation control unit 102 refers to the application type 124D of the process using the conflicting communication system to determine whether or not any one of the following two conditions is satisfied. The two conditions specifically include a condition that the found type is other than "General" (that is, a type only requiring intermittent communication) and a condition that the priority level of the conflicting communication system is higher than the priority level of the application type of the application software implemented by the process to be activated by comparing the two priority levels.

When the application type of the conflicting communication system is "General" and has a priority level equal to or less than the application to be activated by comparing the two priority levels ("No" in Step S104), the communication system allocation control unit 102 opens a communication path used by the application using the conflicting communication system, activates the application to be activated, and notifies the user of the activation (Step S105). Specifically, the communication system allocation control unit 102 instructs any one of the mobile communication unit 130, the wireless LAN communication unit 131, the USB communication unit 132, the Bluetooth communication unit 133, and the HDMI communication unit 134 used by the process using the conflicting communication system to finish communication, and instructs the corresponding communication unit to receive a communication request from the process to be newly activated. The communication system allocation control unit 102 then displays on the display connected to the connection device 100 a message indicating that communication used by the process currently operating is disconnected and the process is activated. The communication system allocation control unit 102 then ends the application activation processing.

When the application type of the conflicting communication system is other than "General" or has a priority level higher than that of the application to be activated ("Yes" in Step S104), the communication system allocation control unit 102 inquires of the user whether or not the communication of the conflicting application can be finished (Step S106). Specifically, the communication system allocation control unit 102 displays on the display connected to the connection device 100 a message indicating that the user is required to input to select whether or not the communication used by the process currently operating is disconnected in order to activate the process to be activated, and receives the selection input.

The communication system allocation control unit 102 then determines whether or not the user disapproves of the finish of the process currently operating (Step S107). Specifically, the communication system allocation control unit 102 determines whether or not the selection input received in Step S106 is the one that does not allow the finish of the communication. When the selection input is the one that allows the finish of the communication, the communication system allocation control unit 102 advances the control to Step S105.

When the user disapproves of the finish of the communication ("Yes" in Step S107), the communication system allocation control unit 102 notifies that the activation of the application to be activated fails (Step S108). Specifically, the communication system allocation control unit 102 outputs to the display connected to the connection device 100 a message indicating that the communication system of the process to be activated conflicts with the process currently operating and hence the activation of the application to be activated fails. The communication system allocation control unit 102 then ends the application activation processing.

The processing flow of the application activation processing is described above. According to the application activation processing, at the time of the activation of the process of the application software, when the communication cannot be established with the use of the communication system to be used by the application software, it is possible to appropriately allocate the communication system based on its priority level or the like to activate the application software.

Figure 8:
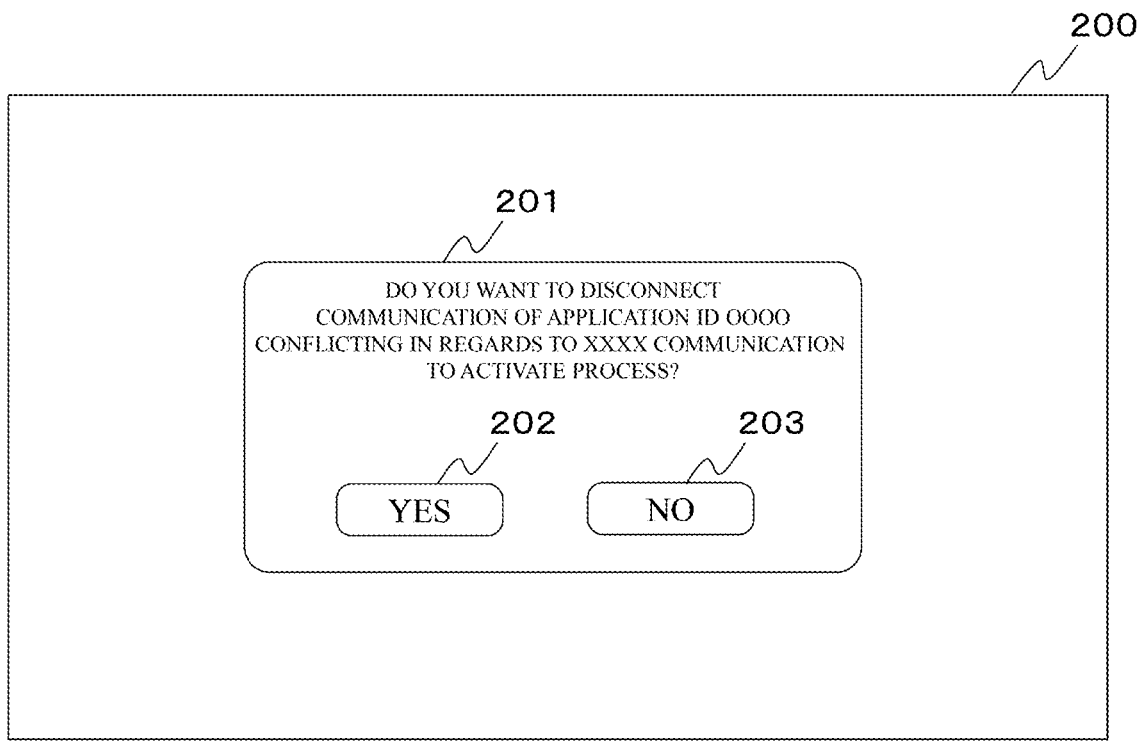
FIG. 8 shows an example of a finish confirmation screen.

FIG. 8 shows an example of a display screen 200 displaying the message indicating that the user is required to input to select whether or not the communication used by the process currently operating is disconnected in order to activate the process to be activated, which is displayed in Step S106 of the application activation processing.

The display screen 200 displaying the message includes a message display area 201 and an affirmative instruction input area 202 and a negative instruction input area 203 for the message. In the message display area 201, the message indicating that the user is required to input to select whether or not the communication used by the process currently operating is disconnected in order to activate the process to be activated is displayed as a character string. For example, a message such as "DO YOU WANT TO DISCONNECT COMMUNICATION OF APPLICATION ID OOOO CONFLICTING IN REGARDS TO XXXX COMMUNICATION TO ACTIVATE PROCESS?" is displayed. The affirmative instruction input area 202 is an area which receives an input indicating the affirmation or agreement to the message. The negative instruction input area 203 is an area which receives an input indicating the disapproval or disagreement to the message.

Figure 9:
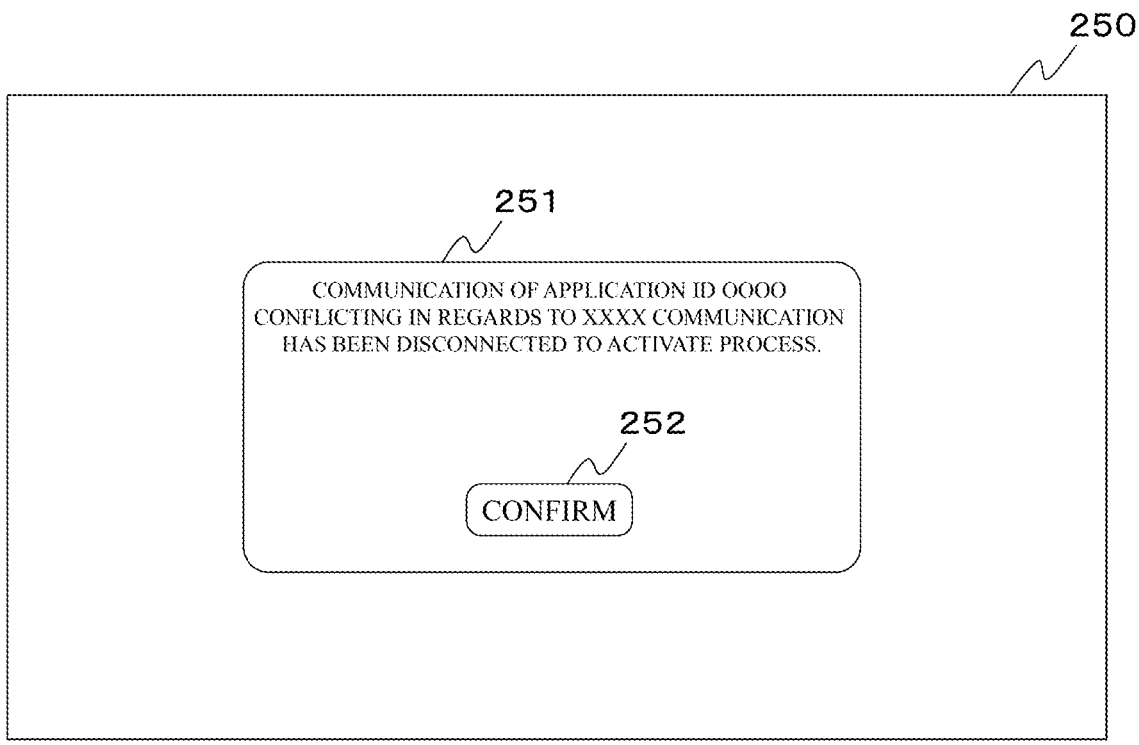
FIG. 9 shows an example of an application activation completion screen.

FIG. 9 shows an example of a display screen 250 displaying the message indicating that the communication conflicting in regards to the communication system used by the process currently operating has been disconnected in order to activate the process to be activated, which is displayed in Step S105 of the application activation processing.

The display screen 250 displaying the message includes a message display area 251 and a confirmation instruction input area 252 for the message. In the message display area 251, the message notifying that the communication used by the process currently operating has been disconnected in order to activate the process to be activated is displayed as a character string. For example, a message such as "COMMUNICATION OF APPLICATION ID OOOO CONFLICTING IN REGARDS TO XXXX COMMUNICATION HAS BEEN DISCONNECTED TO ACTIVATE PROCESS." is displayed. The confirmation instruction input area 252 is an area which receives an input indicating the confirmation to the message.

The configuration and processing details of the connection device 100 according to the first embodiment are described above. According to the first embodiment, in a case where the communication systems of pieces of application software conflict with each other within the range of the communication system usable by another device connected to the connection device 100, it is possible to appropriately allocate the communication system to activate the process based on the priority level that is defined for each type of the application software. In other words, according to the first embodiment, it is possible to smoothly execute a plurality of pieces of application software which perform communication via the communication path.

The present invention is, however, not limited to the embodiment described above. Various modifications can be made to the first embodiment described above within the range of the technical idea of the present invention.

Now, a description is given of modified examples of the present invention. For example, one communication system to be used is defined at most for each piece of application software in the first embodiment, but the present invention is not limited thereto. One or a plurality of communication systems to be used can also be defined for each piece of application software. A description is given of a second embodiment of the present invention, which is configured in this manner, with reference to FIG. 10 and FIG. 11. Note that, the second embodiment basically has the same configuration as that of the first embodiment, and hence a description is given of what is different from the first embodiment.

FIG. 10 shows a data structure of an application communication system storage area 121' according to the second embodiment. The application communication system storage area 121' includes, in place of the communication scheme 121D of the application communication system storage area 121 according to the first embodiment, a main communication system 121E, a second communication system 121F, which is another communication system that can be an alternative to the main communication system 121E when communication cannot be established with the use of the main communication system 121E, and a third communication system 121G, which is still another communication system. As another example, the application communication system storage area 121' may further include other communication systems such as fourth and fifth communication systems.

Figure 11:
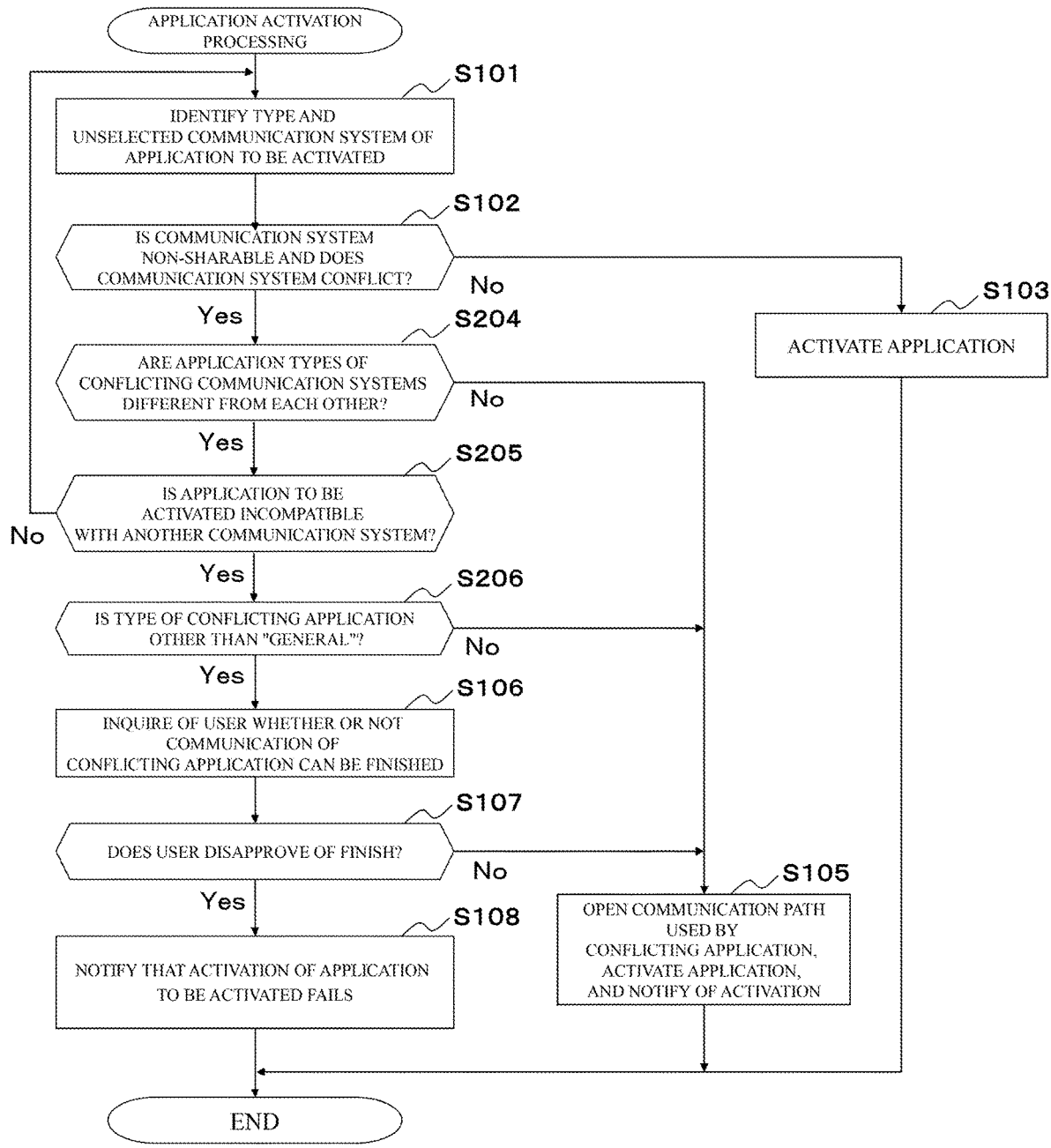
FIG. 11 is a diagram illustrating a flow of application activation processing according to the second embodiment of the present invention.

FIG. 11 is a diagram illustrating a processing flow of application activation processing according to the second embodiment. The flow of the application activation processing according to the second embodiment is basically the same as the flow of the application activation processing according to the first embodiment, but those flows are different from each other as follows.

It is assumed that one communication system is selected in Step S101, and when "Yes" is determined in Step S102 (the communication system is non-sharable and conflicts), the communication system allocation control unit 102 determines whether or not the application types of the conflicting communication systems are different from each other (Step S204). Specifically, the communication system allocation control unit 102 acquires the application type 124D of the process using the conflicting communication system, and compares the application type 124D with the application type 121C of the process to be activated to determine whether or not those application types are the same as each other or are different from each other. When those application types are the same as each other, the communication system allocation control unit 102 advances the control to Step S105, and opens the communication path of the conflicting process.

When the application types of the conflicting communication systems are different from each other ("Yes" in Step S204), the communication system allocation control unit 102 determines whether or not the application to be activated is incompatible with another communication system (Step S205). Specifically, the communication system allocation control unit 102 refers to the application communication system storage area 121' for the process to be activated to verify whether or not there is an alternative communication scheme. When there is an alternative communication system, the communication system allocation control unit 102 determines that the application to be activated is compatible with another communication system, and determines that the application to be activated is incompatible with another communication system when there is no alternative communication system. When the application to be activated is compatible with another communication system, the communication system allocation control unit 102 returns the control to Step S101, and identifies the alternative communication system that has not been selected.

When the application to be activated is incompatible with another communication system ("Yes" in Step S205), the communication system allocation control unit 102 determines whether or not the type of the application using the conflicting communication system is other than "General" (Step S206). Specifically, the communication system allocation control unit 102 determines whether or not the application type of the process using the conflicting communication system is other than "General", that is, is other than the type only requiring intermittent communication. When the application type is the type only requiring intermittent communication, the communication system allocation control unit 102 advances the control to Step S105. When the application type is other than the type allowing intermittent communication, the communication system allocation control unit 102 advances the control to Step S106.

The processing flow of the application activation processing according to the second embodiment is described above. According to the application activation processing of the second embodiment, in a case where the application software to be activated is compatible with a plurality of communication systems, it is possible to activate the application software to be activated with the use of another communication system while avoiding the use of the conflicting communication system as much as possible. In other words, according to the second embodiment, when another process in execution that is different from the process to be activated already uses at least one of the communication systems usable by the process to be activated, it is possible to allocate the unused communication system to the process to be activated as the communication system to be used.

Further, for example, according to the second embodiment, in the case where the application software to be activated is compatible with the plurality of communication systems, the application software to be activated is activated with the use of another communication system while avoiding the use of the conflicting communication system as much as possible, but the present invention is not limited thereto. In a case where the process using the conflicting communication system has the application type requiring real-time communication (for example, the control unit), the process using the conflicting communication system may change its communication system to the communication system other than the conflicting communication system. A description is given of a third embodiment of the present invention, which is configured in this manner, with reference to FIG. 12. Note that, the third embodiment basically has the same configuration as that of the second embodiment, and hence a description is given of what is different from the second embodiment with reference to FIG. 12 and FIG. 13.

Figure 12:
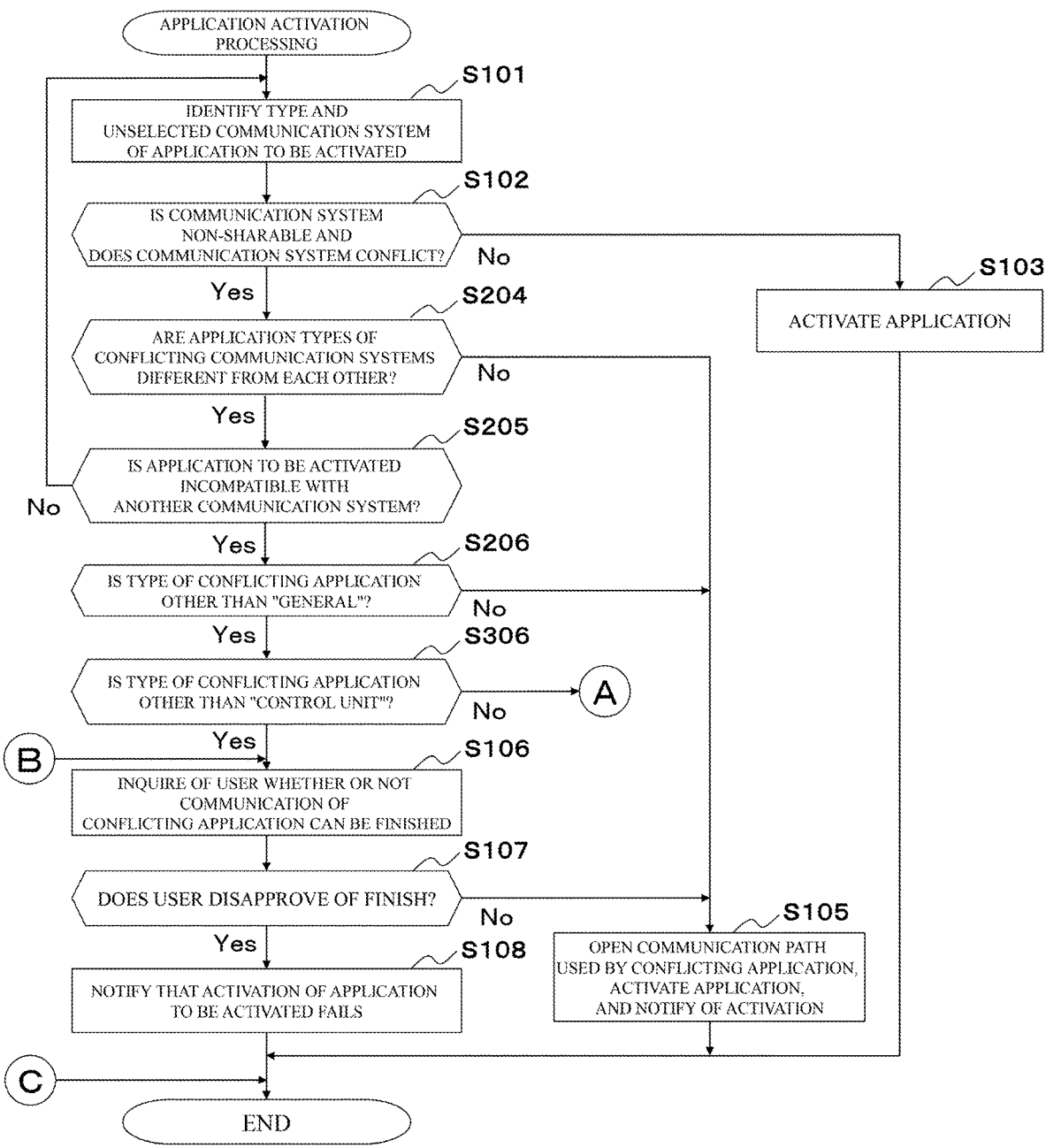
FIG. 12 is a diagram illustrating a flow of application activation processing according to a third embodiment of the present invention.

As illustrated in FIG. 12, in Step S206 of the application activation processing, when the type of the conflicting application is other than "General" ("Yes" in Step S206), the communication system allocation control unit 102 determines whether or not the type of the conflicting application is other than "Control Unit" (Step S306). Specifically, the communication system allocation control unit 102 determines whether or not the application type of the application software implemented by the process using the conflicting communication system is other than "Control Unit", that is, the type other than that requiring real-time communication. When the application type is "Control Unit", the communication system allocation control unit 102 advances the control to processing illustrated in FIG. 13. When the application type is other than "Control Unit", the communication system allocation control unit 102 advances the control to Step S106.

Figure 13:
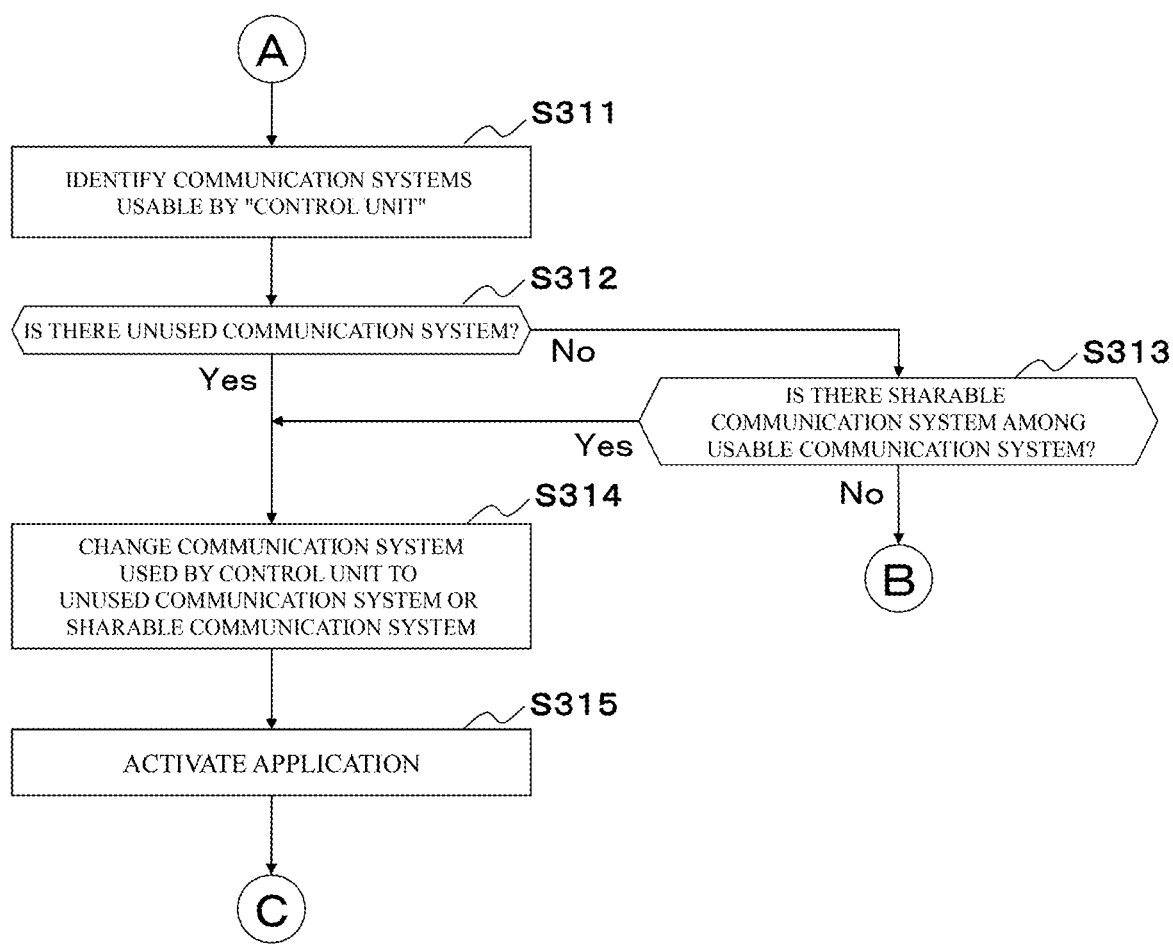
FIG. 13 is a diagram illustrating a part of the flow of the application activation processing according to the third embodiment of the present invention.

FIG. 13 is a diagram illustrating a part of a processing flow of application activation processing according to the third embodiment.

The communication system allocation control unit 102 first identifies the communication systems usable by "Control Unit" (Step S311). Specifically, the communication system allocation control unit 102 refers to the application communication system storage area 121' to identify the communication systems usable by the process using the conflicting communication system.

The communication system allocation control unit 102 then determines whether or not there is an unused communication system among the communication systems usable by "Control Unit" (Step S312).

When there is no unused communication system ("No" in Step S312), the communication system allocation control unit 102 determines whether or not there is a sharable communication system among the usable communication systems (Step S313). Specifically, the communication system allocation control unit 102 refers to the communication sharing propriety storage area 123 to determine whether or not the communication system having "Sharable" as the sharable/non-shareable 123B is included in the usable communication systems. When there is no sharable communication system, the communication system allocation control unit 102 advances the control to Step S106 of the application activation processing of FIG. 12.

When there is an unused communication system ("Yes" in Step S312) or when there is a sharable communication system ("Yes" in Step S313), the communication system allocation control unit 102 changes the communication system used by "Control Unit" using the conflicting communication system to the unused communication system or the communication system that is currently used but is sharable (Step S314).

The communication system allocation control unit 102 then activates the process relating to the application software to be activated (Step S315). The communication system allocation control unit 102 ends the application activation processing of FIG. 12.

A processing flow of the application activation processing according to the third embodiment is described above. According to the application activation processing of the third embodiment, in a case where the application software to be activated is compatible with a plurality of communication systems, it is not only possible to activate the application software to be activated with the use of another communication system while avoiding the use of the conflicting communication system as much as possible, but also possible to, in a case where the application software using the conflicting communication system is compatible with a plurality of communication systems, switch the current communication system to the communication system other than the conflicting communication system for use to secure continuation of communication, to thereby secure communication of both of the application to be activated and the application that is already activated to activate the process.

In other words, according to the third embodiment, in a case where the process in execution has the type of the process requiring continuous communication, when another process in execution that is different from the process in execution already uses at least one of the communication systems usable by the process in execution, it is possible to change the communication system used by the process in execution to an unused communication system.

Further, for example, according to the second embodiment, in the case where the application software to be activated is compatible with the plurality of communication systems, the application software to be activated is activated with the use of another communication system while avoiding the use of the conflicting communication system as much as possible, but the present invention is not limited thereto. In a case where the application software to be activated is compatible with a sharable communication system, the sharable communication system may be used preferentially. A description is given of a fourth embodiment of the present invention, which is configured in this manner, with reference to FIG. 14 and FIG. 15. Note that, the fourth embodiment basically has the same configuration as that of the second embodiment, and hence a description is given of what is different from the second embodiment.

Figure 14:
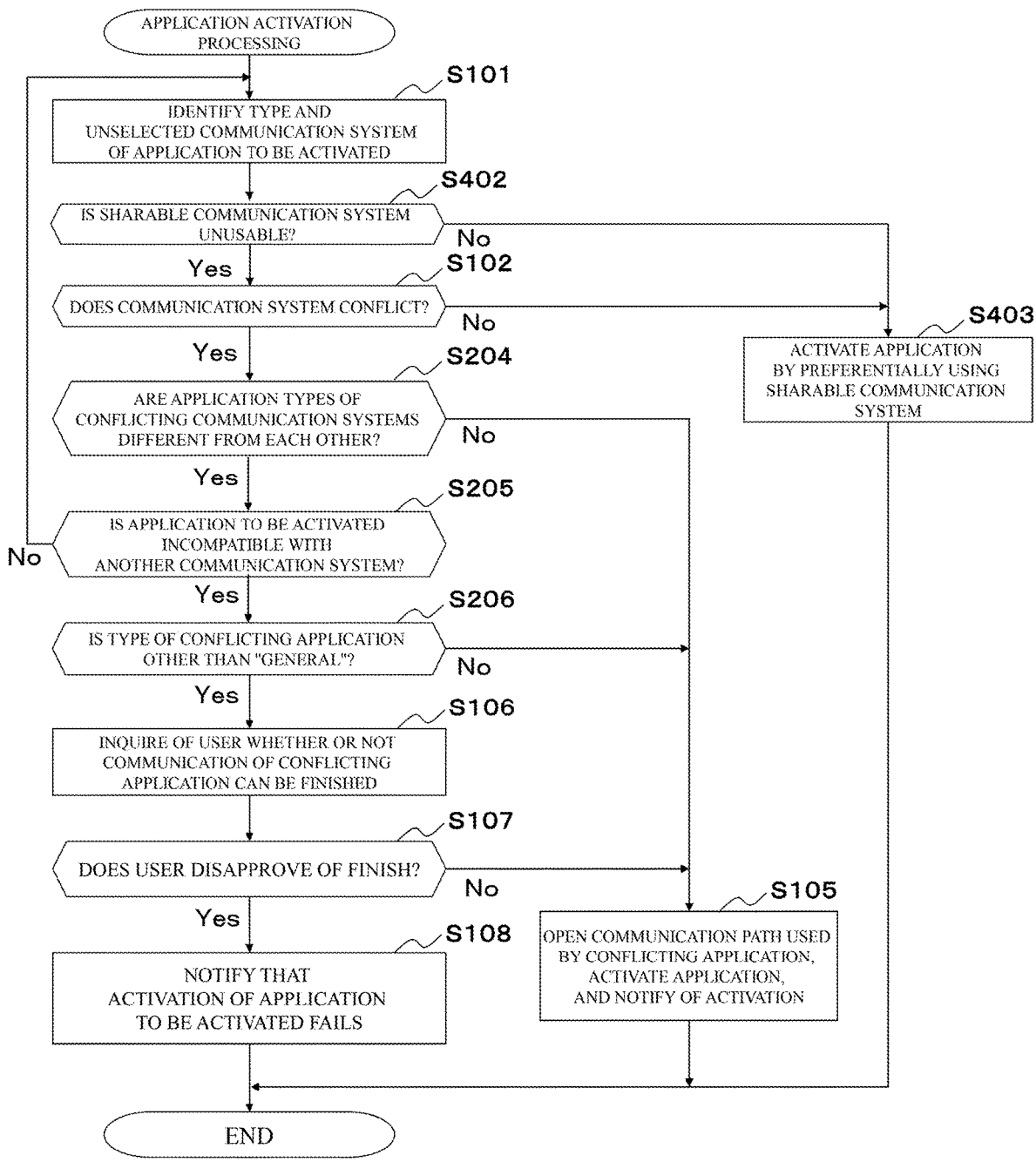
FIG. 14 is a diagram illustrating a flow of application activation processing according to a fourth embodiment of the present invention.

As illustrated in FIG. 14, after Step S101 of the application activation processing is performed to identify the unselected communication system, it is determined whether or not the sharable communication system is unusable by the application software to be activated (Step S402). Specifically, the communication system allocation control unit 102 refers to the communication sharing propriety storage area 123 in regards to the communication systems used by the application software to be activated to determine whether or not the sharable communication system is included in the communication systems. When the sharable communication system is not included, the communication system allocation control unit 102 advances the control to Step S102.

When the sharable communication system is included ("No" in Step S402), the communication system allocation control unit 102 activates the application by preferentially using the sharable communication system (Step S403). Specifically, the communication system allocation control unit 102 uses the communication system identified in Step S101 to start the process of the application software to be activated. The communication system allocation control unit 102 then ends the application activation processing.

A processing flow of the application activation processing according to the fourth embodiment is described above. According to the application activation processing of the fourth embodiment, in a case where the application software to be activated is compatible with a sharable communication system, it is possible to activate the application software to be activated by sharing the communication system even when a conflicting communication system exists.

Figure 15:
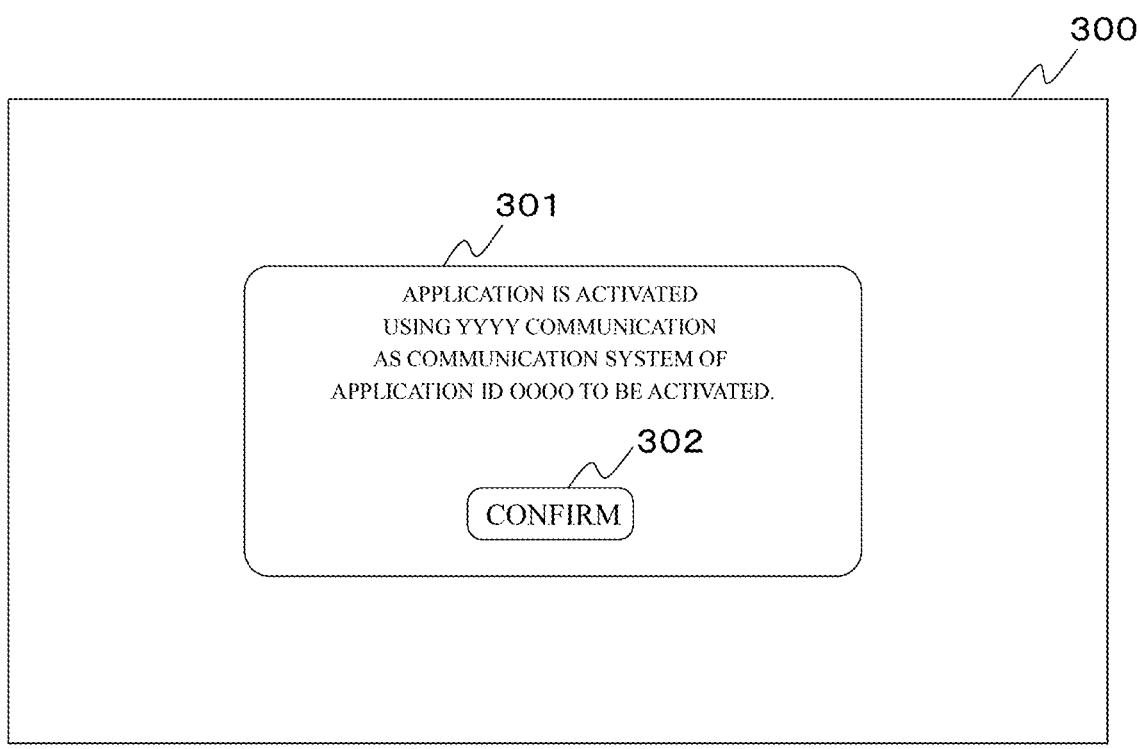
FIG. 15 shows an example of an application activation completion screen according to the fourth embodiment of the present invention.

FIG. 15 shows an example of a display screen 300 displaying a message notifying that the sharable communication system is used to activate the process to be activated, which is displayed in Step S403 of the application activation processing.

The message display screen 300 includes a message display area 301 and a confirmation instruction input area 302 for the message. In the message display area 301, a message notifying that any one of sharable communication systems is used to activate the process to be activated as a character string. For example, a message such as "APPLICATION IS ACTIVATED USING YYYY COMMUNICATION AS COMMUNICATION SYSTEM OF APPLICATION ID OOOO TO BE ACTIVATED." is displayed in the message display area 301. The confirmation instruction input area 302 is an area for receiving an input indicating that the user has confirmed the message.

The fourth embodiment is described above. According to the fourth embodiment, when a sharable communication system is usable by the process to be activated, it is possible to allocate the sharable communication system as the communication system to be used, and hence it is possible to increase an activation speed by reducing a computation amount required for the activation of the process.

Further, for example, in the fourth embodiment, the sharable communication system is used preferentially in the case where the application software to be activated is compatible with the sharable communication system, but the present invention is not limited thereto. When the application software using the conflicting communication system can use the unused communication system, the communication system of the conflicting application software may be changed to activate the process of the application software to be activated. A description is given of a fifth embodiment of the present invention, which is configured in this manner, with reference to FIG. 16 and FIG. 17. Note that, the fifth embodiment has basically the same configuration as that of the fourth embodiment, and hence a description is given of what is different from the fourth embodiment.

Figure 16:
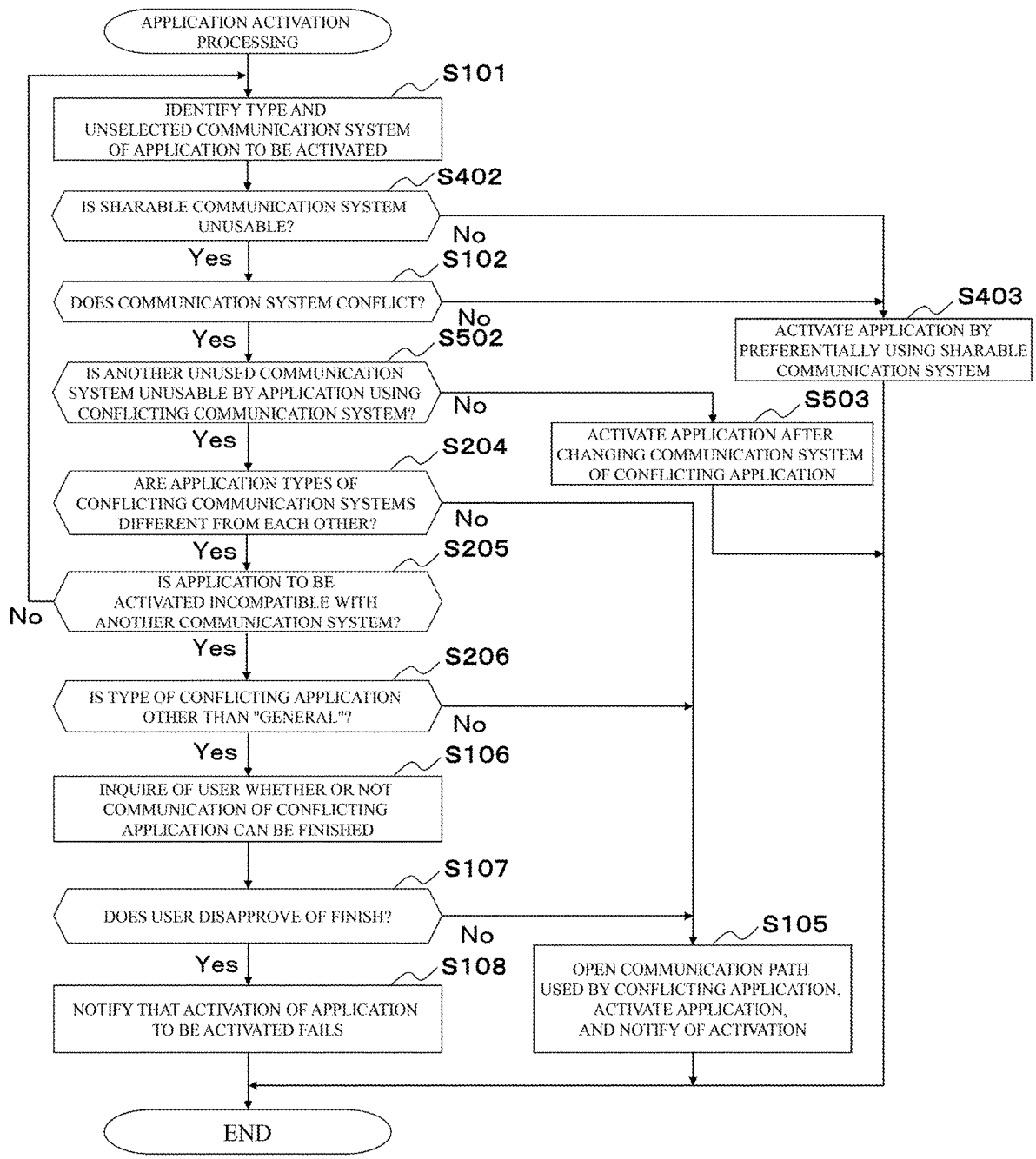
FIG. 16 is a diagram illustrating a flow of application activation processing according to a fifth embodiment of the present invention.

As illustrated in FIG. 16, when it is determined in Step S102 of the application activation processing that the communication system conflicts ("Yes" in Step S102), the communication system allocation control unit 102 determines whether or not another unused communication system is unusable by the application using the conflicting communication system (Step S502). Specifically, the communication system allocation control unit 102 refers to the communication sharing propriety storage area 123 and the application identifier 124C of the communication state storage area 124 in regards to the communication system used by the conflicting application software to determine whether or not another unused communication system in a usable state is not included. When such communication system is not included, the communication system allocation control unit 102 advances the control to Step S204.

When the communication system in a usable state is included in other communication systems usable by the conflicting application software ("No" in Step S502), the communication system allocation control unit 102 activates the application after changing the communication system of the conflicting application (Step S503). Specifically, the communication system allocation control unit 102 instructs any one of the mobile communication unit 130, the wireless LAN communication unit 131, the USB communication unit 132, the Bluetooth communication unit 133, and the HDMI communication unit 134 used by the process using the conflicting communication system to finish communication, and instructs the corresponding communication unit to receive a communication request from the process to be newly activated. The communication system allocation control unit 102 then allocates to the conflicting application another communication system in a usable state as the communication system to be used. The communication system allocation control unit 102 then outputs to the display connected to the connection device 100 a message indicating that the communication used by the process currently operating is disconnected to activate the process. The communication system allocation control unit 102 then ends the application activation processing.

The processing flow of the application activation processing according to the fifth embodiment is described above. According to the application activation processing of the fifth embodiment, in a case where the application software using the conflicting communication system is compatible with anther communication system in a usable state, it is possible to change the communication system of the application software using the conflicting communication system to activate the application to be activated.

Figure 17:
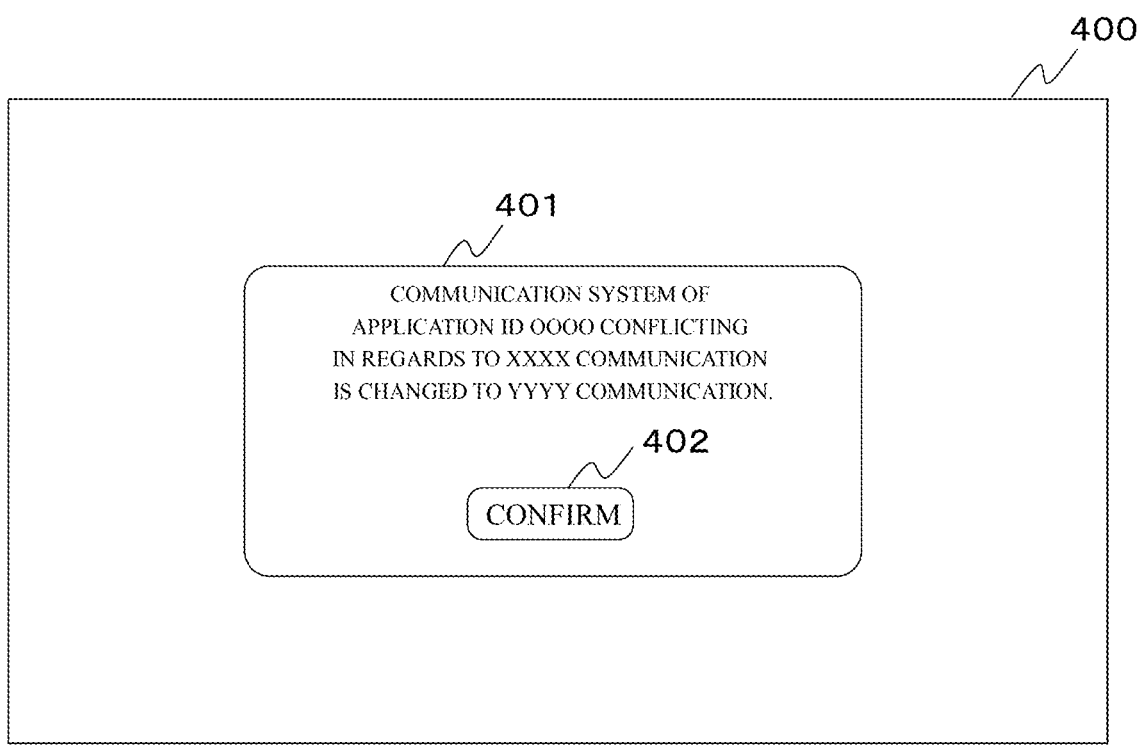
FIG. 17 shows an example of an application activation completion screen according to the fifth embodiment of the present invention.

FIG. 17 shows an example of a display screen 400 displaying a message notifying that the process to be activated has been activated after the change of the communication system of the process using the conflicting communication system, which is displayed in Step S503 of the application activation processing.

The message display screen 400 includes a message display area 401 and a confirmation instruction input area 402 for the message. In the message display area 401, a message notifying that the process to be activated has been activated after the change of the communication system of the process using the conflicting communication system is displayed as a character string. For example, a message such as "COMMUNICATION SYSTEM OF APPLICATION OOOO CONFLICTING IN REGARDS TO XXXX COMMUNICATION HAS BEEN CHANGED TO YYYY COMMUNICATION." is displayed in the message display area 401. The confirmation instruction input area 402 is an area for receiving an input indicating that the user has confirmed the message.

The fifth embodiment is described above. According to the fifth embodiment, it is possible to change the communication system of the process in execution using the conflicting communication system to another communication system in a usable state to appropriately activate the process to be activated with the use of a communication system convenient for the process to be activated. In other words, according to the fifth embodiment, in a case where another process in execution that is different from the process in execution already uses at least one communication system among the communication systems usable by the process in execution, it is possible to change the communication system used by the process in execution to an unused communication system.

A description is given above of the embodiments of the present invention by way of the first to fifth embodiments. The present invention is, however, not limited to each of the above-mentioned embodiments, and the characteristic processing described above in each of the above-mentioned embodiments may also be combined with another embodiment, or may also be applied to another device (for example, the connection device 100 is applied to a printer). Further, the communication system allocation control unit 102 which implements those functions may be distributed as a hardware part, or may be distributed as a software program or a storage medium having stored thereon the software program that is readable by a personal computer.

What is claimed is:

1. A connection device, comprising:
   a non-transitory computer-readable storage medium which stores type priority level information for specifying a priority level assigned in advance for each type of a process, usable communication system information that specifies a communication system that is usable for each process, and sharing propriety information that specifies whether or not the usable communication system is sharable among a plurality of processes during a same period of time; and
   a processor programmed to execute instructions stored in the non-transitory computer-readable storage medium, the instructions causing the processor to:
   communicate to and from another device with use of a plurality of communication systems that are different from one another;

use the usable communication system information to identify the communication system that is usable by a process to be started to be executed; and determine whether the identified communication system is not sharable and a process in execution that is different from the process to be started to be executed already uses the identified communication system;

determine, as a first determination, whether a type of the process in execution is a predetermined type and the priority level of the process in execution is equal to or lower than the priority level of the process to be started to be executed;

in response to determining that the first determination is positive, output a request for a response from a user of the connection device indicating whether a communication path of the process in execution can be disconnected, and determine, as a second determination, whether to activate the process to be started to be executed based on the response from the user; and in response to determining that the second determination is positive, activate the process to be started to be executed and release the communication path to be used by the process to be started to be executed;

wherein, when there is a change in a configuration in the another device, the processor acquires information to specify the communication system, which is compatible with the another device after the change of the communication system, from a predetermined server device and updates the usable communication system information.

2. The connection device according to claim 1, wherein, when the processor releases the communication path, the processor displays on a display a message indicating that communication used by the process in execution is disconnected and the process to be executed is activated.

3. A connection device, comprising:

a non-transitory computer-readable storage medium which stores type priority level information that specifies a priority level assigned in advance for each type of a process, usable communication system information that specifies a usable communication system for each process, and sharing propriety information that specifies whether or not the communication system is sharable among a plurality of processes during a same period of time; and a processor programmed to execute instructions stored in the non-transitory computer-readable storage medium, the instructions causing the processor to:

communicate to and from another device with use of communication systems that are different from one another;

use the usable communication system information to identify the communication system usable by a process to be started to be executed;

determine whether the identified communication system is not sharable and a process in execution that is different from the process to be started to be executed already uses the identified communication system;

determine, as a first determination, whether a type of the process in execution is a predetermined type and the priority level of the process in execution is equal to or lower than the priority level of the process to be started to be executed;

in response to determining that the first determination is positive, output a request for a response from a user of the connection device indicating whether a communication path of the process in execution can be disconnected, and determine, as a second determination, whether to activate the process to be started to be executed based on the response from the user; and in response to determining that the second determination is positive, activate the process to be started to be executed and release the communication path to be used by the process to be started to be executed;

wherein, when there is a change in a configuration in the another device, the processor acquires information to specify the communication system, which is compatible with the another device after the change of the communication system, from a predetermined server device and updates the usable communication system information.

4. The connection device according to claim 1, wherein the communication systems comprise at least a plurality of wireless communication systems having standards different from one another.

5. A connection device according to claim 1, wherein the types of the process comprise at least a real-time communication type process requiring continuous communication and an intermittent communication type process only requiring communication performed at a predetermined timing.

6. A connection method for assisting connection for communication to and from another device with use of a computer that includes a non-transitory computer-readable storage medium which stores type priority level information for specifying a priority level assigned in advance for each type of a process, usable communication system information for specifying a usable communication system for each process, and sharing propriety information for specifying whether or not the communication system is sharable among a plurality of processes during a same period of time; and a processor programmed to execute instructions stored in the non-transitory computer-readable storage medium, the instructions causing the processor to: communicate to and from the another device with use of a plurality of communication systems different from one another; and allocate the communication system to be used by the process, the processor executing the connection method comprising:

identifying the communication system usable by the process to be started to be executed based on the usable communication system information;

determining whether the identified communication system is not sharable and a process in execution that is different from the process to be started to be executed already uses the identified communication system;

determining, as a first determination, whether the type of the process in execution is a predetermined type and the priority level of the process in execution is equal to or lower than the priority level of the process to be started to be executed;

in response to determining that the first determination is positive, outputting a request for a response from a user of the connection device indicating whether a communication path of the process in execution can be disconnected, and determining, as a second determination, whether to activate the process to be started to be executed based on the response from the user; and in response to determining that the second determination is positive, activating the process to be started to be executed and releasing the communication path to be used by the process to be started to be executed;

wherein, when there is a change in a configuration in the another device, the processor acquires information to specify the communication system, which is compatible with the another device after the change of the communication system, from a predetermined server device and updates the usable communication system information.

7. The connection method according to claim 6, wherein, when the processor releases the communication path, the processor displays on a display a message indicating that communication used by the process in execution is disconnected and the process to be executed is activated.

8. The connection method according to claim 6, wherein the communication systems comprise at least a plurality of wireless communication systems having standards different from one another.

9. The connection method according to claim 6, wherein the types of the process comprise at least a real-time communication type process requiring continuous communication and an intermittent communication type process only requiring communication performed at a predetermined timing.

* * * * *